(12) United States Patent
Crum

(10) Patent No.: US 11,872,826 B1
(45) Date of Patent: Jan. 16, 2024

(54) ADJUSTABLE PRINTING SYSTEMS AND METHODS OF MAKING AND USING SAME

(71) Applicant: WARD KRAFT, INC., Fort Scott, KS (US)

(72) Inventor: Jesse Crum, Fort Scott, KS (US)

(73) Assignee: Rekon, LLC, Pittsburg, KS (US)

(*) Notice: Subject to any disclaimer, the term of this patent is extended or adjusted under 35 U.S.C. 154(b) by 0 days.

(21) Appl. No.: 16/685,112

(22) Filed: Nov. 15, 2019

Related U.S. Application Data

(60) Provisional application No. 62/767,926, filed on Nov. 15, 2018.

(51) Int. Cl.
| | |
|---|---|
| B41J 3/36 | (2006.01) |
| B41J 29/13 | (2006.01) |
| B41J 3/44 | (2006.01) |
| B41J 3/407 | (2006.01) |
| G06K 1/12 | (2006.01) |
| B41J 29/02 | (2006.01) |

(52) U.S. Cl.
CPC ............ B41J 3/36 (2013.01); B41J 3/4075 (2013.01); B41J 3/445 (2013.01); B41J 29/02 (2013.01); B41J 29/13 (2013.01); G06K 1/121 (2013.01)

(58) Field of Classification Search
CPC ... B41J 3/36; B41J 3/4075; B41J 3/445; B41J 29/02; B41J 29/13; G06K 1/121
See application file for complete search history.

(56) References Cited

U.S. PATENT DOCUMENTS

| | | | | |
|---|---|---|---|---|
| 4,283,731 | A * | 8/1981 | Bok | B41J 3/283 346/25 |
| 5,825,995 | A * | 10/1998 | Wiklof | B41J 2/16511 358/472 |
| 2004/0011227 | A1 * | 1/2004 | Shadrach, III | B41J 3/4073 101/35 |
| 2007/0120937 | A1 * | 5/2007 | Ahne | B41J 3/36 347/109 |
| 2010/0259037 | A1 * | 10/2010 | Hanrahan | G09F 3/10 156/60 |
| 2014/0063096 | A1 * | 3/2014 | Pitz | B41J 11/002 347/9 |
| 2016/0271871 | A1 * | 9/2016 | Lee | B29C 48/02 |
| 2018/0203650 | A1 * | 7/2018 | Le | B65C 9/40 |

* cited by examiner

Primary Examiner — Justin Seo
Assistant Examiner — Tracey M McMillion
(74) Attorney, Agent, or Firm — AVEK IP, LLC

(57) ABSTRACT

A method to print indicia on a substrate comprises attaching a portable printer to an automated arm. The method includes detecting the substrate using a sensor. The method comprises printing indicia on a first face of the substrate using the portable printer. The method includes the steps of causing the automated arm to move the portable printer and printing indicia on a second face of the substrate using the portable printer.

16 Claims, 6 Drawing Sheets

ADJUSTABLE PRINTING SYSTEMS AND METHODS OF MAKING AND USING SAME

CROSS-REFERENCE TO RELATED APPLICATIONS

This application claims priority to U.S. Provisional Patent Application, Ser. No. 62/767,926, filed Nov. 15, 2018, the disclosure of which is incorporated herein by reference in its entirety.

FIELD OF THE DISCLOSURE

The disclosure relates generally to the field of adjustable printing systems. More specifically, the disclosure relates to adjustable printing systems employing one or more portable printers configured to print indicia directly on the substrate.

SUMMARY

Systems and methods for printing substrates using adjustable printing systems are disclosed herein.

In an embodiment, a method to print indicia on a substrate comprises attaching a portable printer to an automated arm. The method includes detecting the substrate using a sensor. The method comprises printing indicia on a first face of the substrate using the portable printer. The method includes the steps of causing the automated arm to move the portable printer and printing indicia on a second face of the substrate using the portable printer.

In another embodiment, a method to print indicia on a substrate comprises attaching a portable printer to an automated arm. The automated arm has at least one rotation device configured to move said automated arm. The method includes detecting the substrate on a conveyer belt using a sensor. The method comprises printing indicia on a first face of the substrate using the portable printer. The method includes printing indicia on a second face of the substrate using the portable printer.

In yet another embodiment, a method to print indicia on a substrate comprises attaching a portable inkjet printer to a movable arm. The method includes printing indicia on a first face of the substrate using the portable printer. The method comprises moving the movable arm to move the portable printer. The method includes printing indicia on a second face of the substrate using the portable printer. The movable arm is configured to be telescoping.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

Label applicators for printing and applying labels (e.g., shipping labels, return labels, product labels, etc.) to substrates are known in the art. A traditional label applicator apparatus comprises a printer for printing indicia on the label and a tamp head which in its original position is situated upwardly adjacent the printed label. The tamp head working surface extends generally horizontally and may have vacuum nozzles or other means for holding the label to the tamp head during the application process. The label is passed through the printer which prints indicia on the label, and then the label is pushed laterally underneath the tamp head. The tamp head remains stationary until the printing of the label is complete and the label is brought in registry with the tamp head above the label. Once the label printing is complete and the entire label is below and in registry with the tamp head, the tamp head moves vertically downward towards a substrate and, due to the vacuum, causes the printed label to travel with the tamp head. The tamp head eventually sandwiches the printed label between itself and the substrate (e.g., the package to which the label is to be adhered, which may be brought underneath the tamp head via a conveyer belt for instance). The adhesive on the underside of the label (e.g., on the face stock thereof) causes the label to adhere to the substrate. The tamp head then moves vertically back up to its original position, and the next label is subsequently printed and situated underneath the tamp head so that the tamp head can apply the next label to the next substrate (e.g., another box on the moving conveyer belt). This process is repeated for each label that is printed and applied to a substrate.

One issue with the traditional label printer and applicator system is that such systems are relatively unadaptable. For instance, the traditional label and printer systems are unable to print directly on certain substrates (e.g., a shipping package) since those substrates cannot be passed through the printer. As another example, a singular traditional printer and applicator cannot apply the labels to more than one surface at a time, generally requiring multiple devices and/or multiple production line runs (i.e., more time) if applying labels to more than one surface of a substrate is required. Such systems may be undesirable because of the cost associated with purchasing and maintaining multiple devices, and/or because of the increased time to apply indicia to the substrate. Furthermore, the labels themselves have a cost associated therewith which may be undesirable. Embodiments of the present disclosure may relate to an indicia printing system that may, at least in part, resolve the issues with using traditional devices for printing on surfaces.

Figure 1:
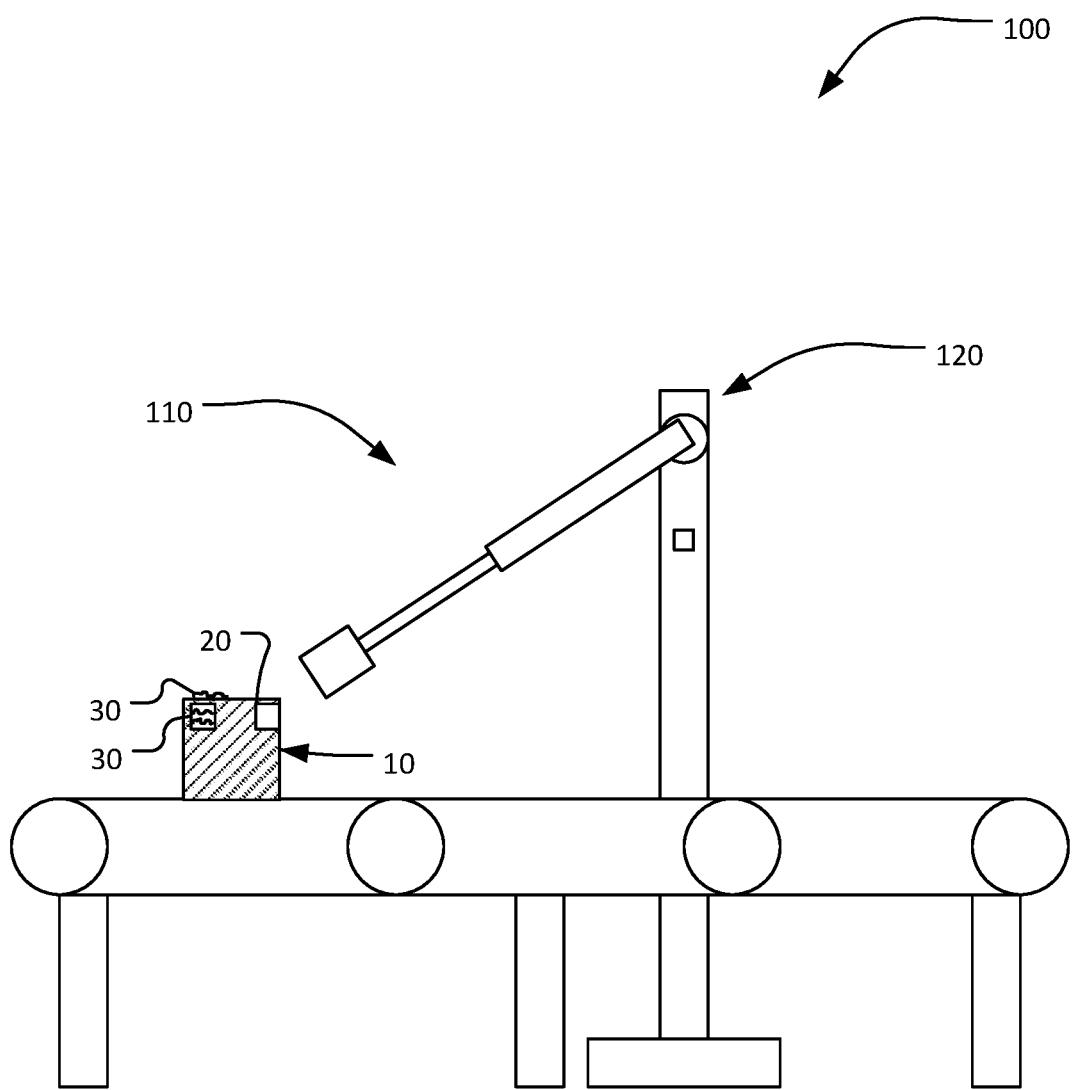
FIG. 1 is a side view of an adjustable printing system employing a portable printer, according to an embodiment of the present disclosure.
Figure 2:
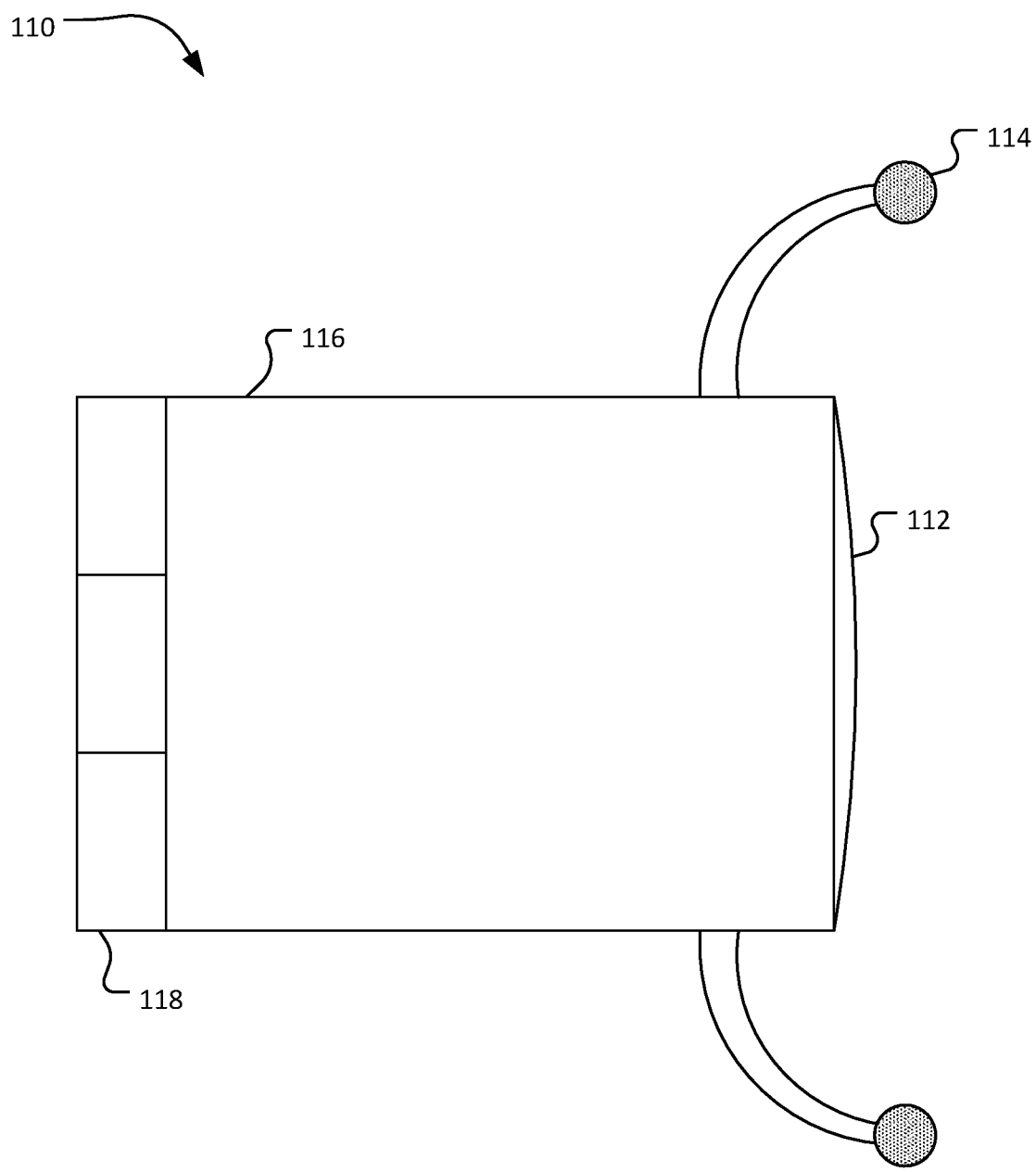
FIG. 2 is a top view of a printer of the adjustable printing system of FIG. 1.
Figure 3:
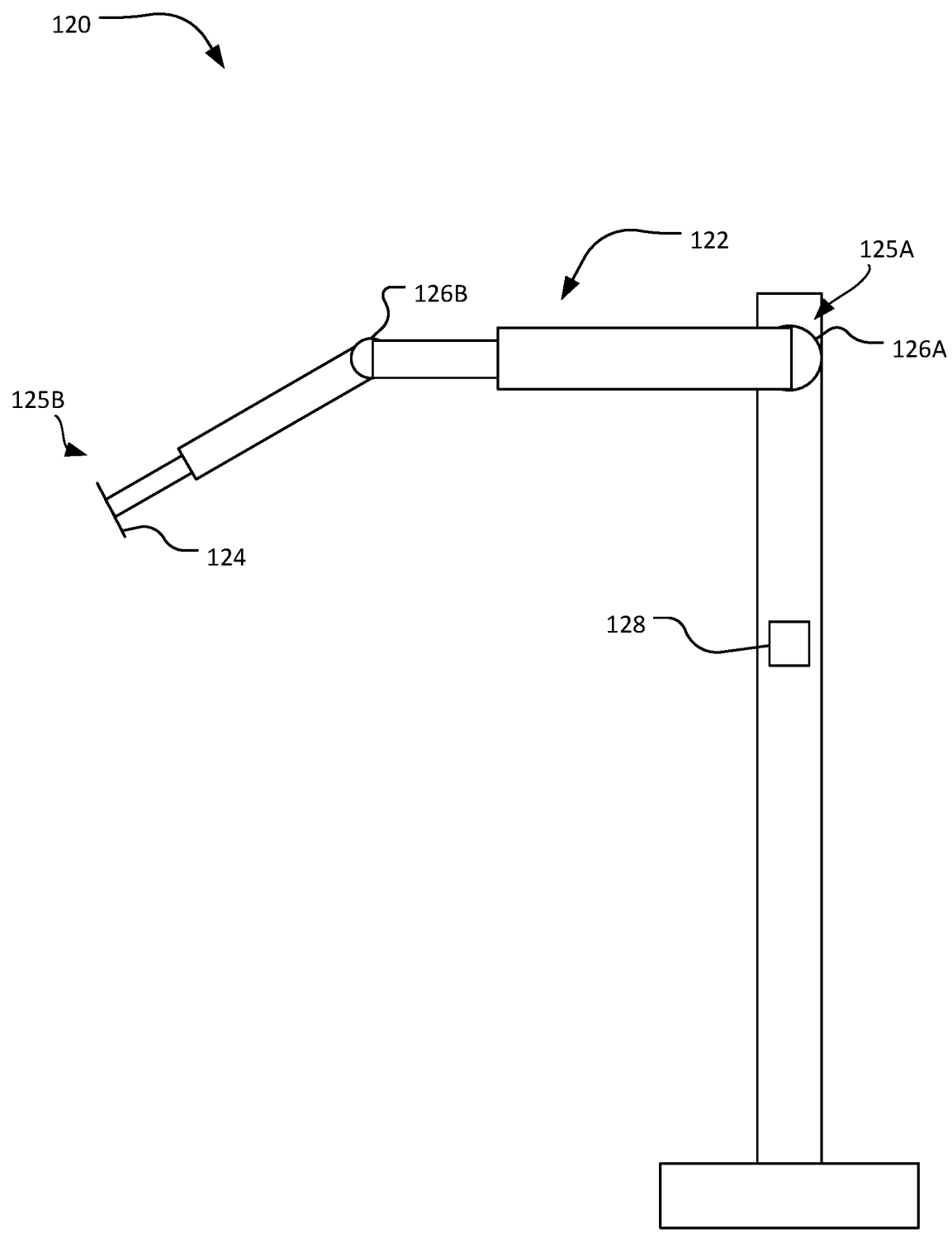
FIG. 3 is a side view of an arm of the adjustable printing system of FIG. 1.

FIGS. 1 through 3 show an embodiment 100 of an adjustable printing system (also referred to herein as an "adjustable printing apparatus" or an "adjustable printing system"). The adjustable printing system 100 may be used to print indicia on any surface, such as single ply labels, multi-ply labels, label products (e.g., coupons, packing slips, etc.), and importantly, directly on the substrates (e.g., directly on cardboard boxes, pallets, concrete, machined parts, et cetera) themselves.

Figure 4:
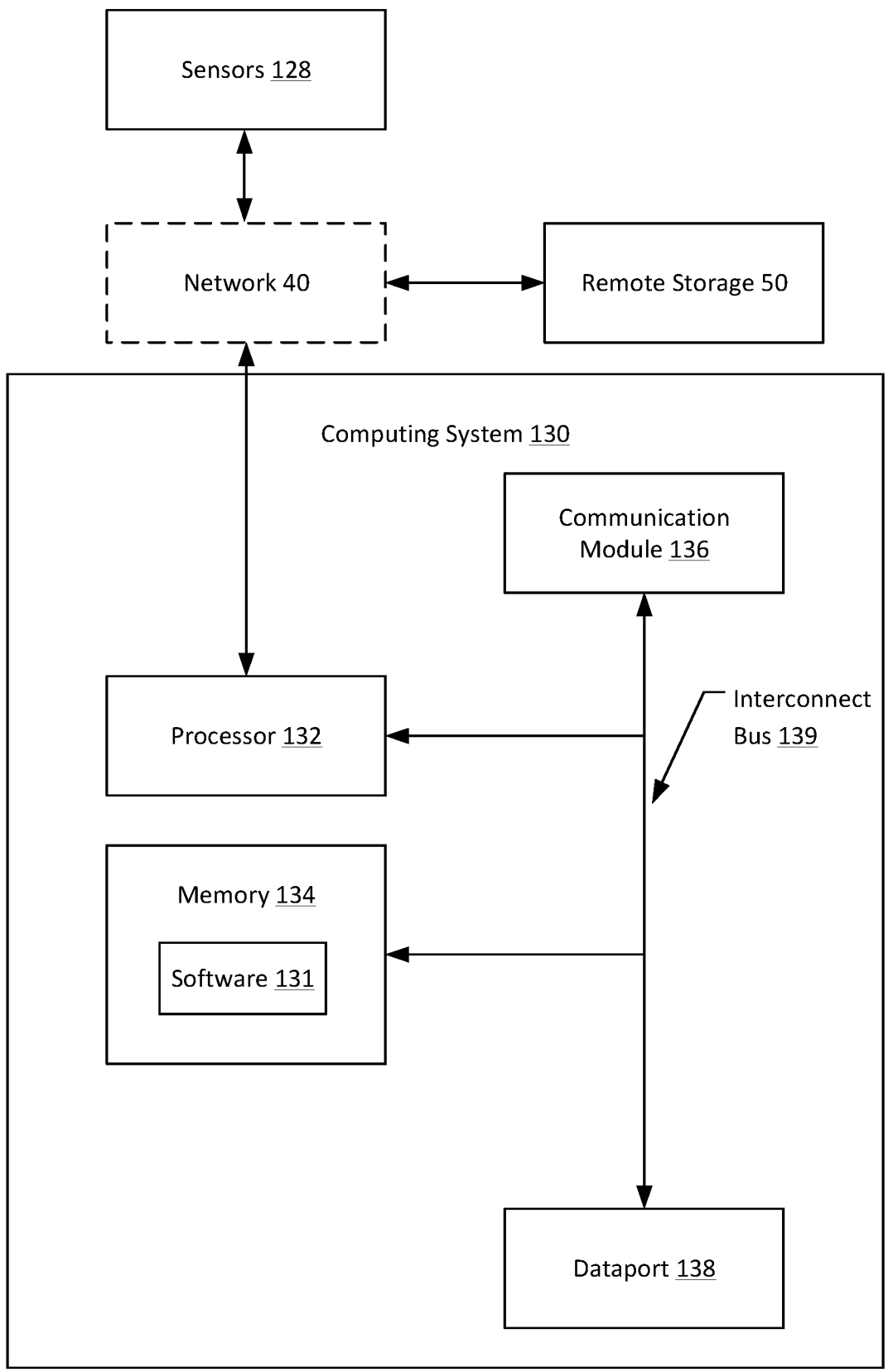
FIG. 4 is a block diagram depicting a computer system of the adjustable printing system of FIG. 1.

The adjustable printing apparatus 100 may, in embodiments, include a printer 110, an automated arm 120, and optionally a computing system 130 (FIG. 4). The apparatus 100 may also have associated therewith moving devices (e.g., a conveyor belt) to bring one or more substrates (e.g., substrate 10 and other substrates) in proximity to the apparatus 100 for interaction therebetween (e.g., for applying printed indicia as discussed below). In embodiments, the apparatus 100 may also be usable to apply one or more labels to a substrate.

The printer 110 may, in embodiments, be a portable printer that is removably or fixedly coupled to the arm 120. In embodiments, the portable printer 110 may be a handheld printer (e.g., have a handle to allow the printer 110 to be grasped for a printing operation). In other embodiments, the portable printer 110 may not be specifically configured to be handheld. As seen in FIG. 2, the printer 110 may, in embodiments, include a print head 112, a housing 116, and a printing device 118 to print indicia 30 (e.g., text, icons, general information, private information, personalized information, promotions, packaging information, shipping information, marketing materials, et cetera). The portable, handheld printer 110 may allow for indicia to be printed on the substrate without the need to pass the substrate therethrough. For example, the printer 110 may be a handheld inkjet (or other) printer configured to print indicia on a substrate downwardly, upwardly, and/or sidewardly adjacent and facing the printer 110 (as opposed to a traditional printer through which the substrate must be passed for printing). For instance, the printer 110 may be the SoJet Elfin 1H handheld inkjet printer, the Reiner JetStamp 970 handheld inkjet printer, the Reiner Speed I Jet 798 printing pen, et cetera.

The indicia 30 may be of a specific type (e.g., color, black and/or white, personalized, generic, etc.) or combination of types. The printing device 118 for printing indicia may include components necessary (e.g., the print head 112, pins, nozzles, ribbons, laser, ink cartridges, etc.) to accomplish any suitable type of printing. Example types of printing that may be utilized by the printing device 118 of printing indicia 30 may include: dot matrix, daisy-wheel, line, drum, chain, band, inkjet, laser, et cetera.

In one embodiment, the printing device 118 may include components configured for inkjet printing (e.g., nozzles, electric field generators, deflecting plates, ink cartridges, et cetera). In some embodiments, the printer 110 may be configured to print indicia 30 directly on a substrate 10, foregoing the use of a label. Alternately, or additionally, the printer 110 may be configured to print indicia on a label. The artisan may understand that the adjustable printing may utilize any printing indicia (e.g., indicia 30) whether now known or later developed and that such printing methodology is within the scope of the present disclosure.

The printer housing 116 may be operably coupled to an attachment portion 124 of the arm 120 (see FIG. 3). In embodiments, the printer housing 116 may be removably coupled to the attachment portion 124 as such may allow the printer 110 to be quickly removed from the arm 120 for handheld (i.e., manual) printing. In other embodiments, the printer housing 116 may be fixedly coupled to the arm 120, e.g., to the attachment portion 124 thereof. In operation, the housing 116 may retain some or all of the components of the printer 110 in and/or around itself. The print head 112, via which the indicia 30 may be printed onto the substrate 10 directly and/or on the label 20 placed thereon, may be operably coupled to the housing 116.

In embodiments, the printer housing 116 may have sensors (e.g., rollers) 114 coupled thereto. The rollers 114 may be disposed on one or more sides (e.g., opposing sides) of the print head 112. In operation, the rollers 114 may allow the printer 110 to detect a path of printing (e.g., whether the printer 110 is printing in a straight line), and send the detected path to a controller (e.g., the computing system 130), which may then adjust the path of printing based upon an evaluation of the printing path (such as based upon a determination that the path detected is inadequate).

The printing location (e.g., the printing path, the printing start point, et cetera) may be changed by causing the printer 110 to adjust its position (e.g., automatically or manually) while the printer 110 is coupled to the attachment portion 124. That is, the printing location may be changed by moving the printer 110 and print head 112 directly. Alternately or in addition, the printing location may be changed by moving the printer 110 indirectly, e.g., by rotating, telescoping, and/or otherwise moving the arm 120. In embodiments, the rollers 114 may actuate the printer 110 for printing (e.g., the printer 110 may be signaled to begin printing indicia 30 once the rollers 114 make contact with the substrate 10, such as in response to a substrate detection signal transmitted by the rollers 114).

The arm 120, as seen in FIG. 3, may include a plunger 122, the attachment portion 124, one or more rotation devices (e.g., 126A, 126B), and one or more sensors 128. The plunger 122 (and/or one or more portions thereof) may be configured to be telescoping or may otherwise be configured to selectively retract and extend.

The rotation devices may be configured to move (e.g., rotate) the attachment portion 124 (and thus also the printer 110) in proximity to a desired substrate 10, such that the printer 110 may be able to print indicia 30 on the substrate 10. The rotation device (e.g., rotation device 126A) may include motors, servo motors, gears, et cetera. In some embodiments, there may be a plurality of rotation devices disposed along the plunger 122 to further increase the mobility of the arm 120 (e.g., a rotational device 126A disposed at a proximal end 125A of the plunger 122, a rotational device 126B disposed between the proximal end 125A and a distal end 125B of the plunger 122 to allow for "bending" of the arm 120, a rotational device disposed between at least one of the plungers 122, et cetera). In embodiments, at least one of the rotational devices 126A, 126B may form a revolute type of joint (e.g., only allow rotation in a single plane). Alternately or additionally, at least one of the rotational devices 126A, 126B may form a spherical type of joint (e.g., allow free rotation about a point, such as a ball and socket joint).

The attachment portion 124 may be a mounting plate, a holster, an end effector such as a robotic hand, et cetera, and may be configured to hold the printer 110 such that it can be selectively moved by the arm 120. In embodiments, the attachment portion 124 may be configured to operate the printer 110 (e.g., by being operably wired to the printer, communicably connected with a separate control unit, by physically interacting with a button or trigger of the printer, et cetera).

One or more sensors 128 (e.g., LiDAR, infrared, etc.) of the arm 120 may be used to detect the presence of a substrate 10, and aid in the process of applying indicia 30 to the substrate 10. That is, the arm 120 may be guided by the sensors 128 to move the printer 110 to the substrate 10 for application of indicia 30. In some embodiments, the sensors 128 may be used to actuate the printer 110 (e.g., once the sensors 128 detect a specific proximity of a substrate 10, a signal is sent for the printer 110 to begin printing indicia 30). Alternately or additionally, the sensors 128 may guide the arm 120 to reposition the printer 110 about a substrate 10. For example, the sensors 128 may guide the arm 120 to move the printer 110 from one side of a substrate 10 (e.g., a box) to an opposite side of the substrate 10 (see FIG. 1 showing indicia 30 is printed on the top and the side of the substrate 10). In some embodiments, the adjustable printing system 100 may be programmed and/or controlled to accomplish the aforementioned functions (e.g., guiding the arm 120 to move the printer 110 to a substrate 10, actuating the printer 110 for printing, repositioning the printer 110 about a substrate 10, et cetera). The artisan will understand from the disclosure herein that the location of the sensor 128 in the figures is merely exemplary and that the one or more sensor(s) 128 may alternately or additionally be located elsewhere (e.g., on the plunger 122 and/or the movable portion thereof, on the conveyer belt, et cetera).

In embodiments, multiple apparatus 100 may be provided (e.g., in a line), to allow for various indicia 30 to be printed on the substrate 10 as the substrate 10 successively travels to the apparatus 100 on a conveyor belt or other production line. For instance, in embodiments, one adjustable printing system 100 may be used to print a packing list on the substrate 10, another downstream adjustable printing system 100 may be used to print a coupon above the packing list, et cetera. In embodiments, the arm 120 and/or other portions of the apparatus 100 may also be configured to adhere a label (e.g., the label 20) to a substrate (e.g., the substrate 10).

In embodiments, the adjustable printing system 100 may be used to print indicia 30 directly on a container 10 (e.g., on a shipping box, a moving a box, a pallet, an envelope, et cetera). Alternately or additionally, the adjustable printing system 100 may be used to print indicia 30 on labels 20 and associated substrates that are permanently or removably adhered to such containers 10. In embodiments, all or some of indicia 30 printed directly on the container 10 and/or on a label 20 adhered to the container may be hidden from view by placing thereon another label 20 or an associated substrate (e.g., a coupon, marketing material, a packing list, et cetera). The placement of one or more of the labels 20 may be automatic (e.g., may be effectuated by an applicator system that is part of the printing system 100 or separate therefrom). Alternately or in addition, one or more of the labels 20 may be disposed on the substrate 10 directly.

In some embodiments, the labels 20 and/or the printed indicia 30 may include marketing materials. The marketing materials may comprise one or more tabs portraying other indicia. The tabs may be attached to and/or formed as part of the conventional liner label, a dissolvable liner label (discussed below), and/or the printed indicia 30. In some embodiments, the tabs may be removably attached to the labels by perforations, allowing for the tabs to be torn off. In embodiments where the marketing materials are incorporated into indicia 30, the marketing materials may be printed as part of the indicia 30. The other indicia may comprise information for a consumer, such as coupons, advertisements, promotions, etc. For example, the marketing materials may be several tabs with "20% OFF NEXT PURCHASE" printed on each of them, and the tabs may be torn away from their labels 20 for use.

FIG. 4 is a functional block diagram of the computing system 130 which may be used to implement the various labeling apparatus embodiments according to the different aspects of the present disclosure. The computing system 130 may be, for example, a smartphone, a laptop computer, a desktop computer, a flexible circuit board, or other computing device whether now known or subsequently developed. The computing system 130 comprises a processor 132, the memory 134, a communication module 136, and a dataport 138. These components may be communicatively coupled together by an interconnect bus 139. The processor 132 may include any processor used in smartphones and/or other computing devices, including an analog processor (e.g., a Nano carbon-based processor). In certain embodiments, the processor 132 may include one or more other processors, such as one or more microprocessors, and/or one or more supplementary co-processors, such as math co-processors.

The memory 134 may include both operating memory, such as random access memory (RAM), as well as data storage, such as read-only memory (ROM), hard drives, optical, flash memory, or any other suitable memory/storage element. The memory 134 may include removable memory elements, such as a CompactFlash card, a MultiMediaCard (MMC), and/or a Secure Digital (SD) card. In certain embodiments, the memory 134 includes a combination of magnetic, optical, and/or semiconductor memory, and may include, for example, RAM, ROM, flash drive, and/or a hard disk or drive. The processor 132 and the memory 134 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 132 may be connected to the memory 134 via the dataport 138.

The communication module 136 may be configured to handle communication links between the computing system 130 and other external devices or receivers, and to route incoming/outgoing data appropriately. For example, inbound data from the dataport 138 may be routed through the communication module 136 before being directed to the processor 132, and outbound data from the processor 132 may be routed through the communication module 136 before being directed to the dataport 138. The communication module 136 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G or any other protocol and/or technology.

The dataport 138 may be any type of connector used for physically interfacing with a smartphone, computer, and/or other devices, such as a mini-USB port or an IPHONE®/IPOD® 30-pin connector or LIGHTNING® connector. In other embodiments, the dataport 138 may include multiple communication channels for simultaneous communication with, for example, other processors, servers, and/or client terminals.

The memory 134 may store instructions for communicating with other systems, such as a computer. The memory 134 may store, for example, a program (e.g., computer program code) adapted to direct the processor 132 in accordance with the embodiments described herein. The instructions also may include program elements, such as an operating system. While execution of sequences of instructions in the program causes the processor 132 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 134 includes software 131. The software 131 may contain machine-readable instructions configured to be executed by the processor 132. The software 131 may, for example, process data obtained from the sensor 128. In embodiments, the software 131 may cause the computing system 130 to dynamically respond to a reading obtained by the sensor 128. For example, the software 131 may direct the automated arm 120 to print indicia 30 in response to a sensor 128 determination that the substrate 10 is within a proximity of the arm 120. As another example, the software 131 may direct the automated arm 120 to move the printing device 118 from one surface of the substrate 10 to another surface of the substrate 10 in response to a sensor 128 detection of the substrate 10.

The computing system 130 may be in data communication with a remote storage 50 over a network 40. The network 40 may be a wired network, a wireless network, or comprise elements of both. In embodiments, the network 40 may communicatively link one or more components of the adjustable printing apparatus 100. For example, the sensor 128 may be communicatively linked to the computing system 130 via the network 40 for the exchange of information therebetween. The remote storage 50 may be, for example, the "cloud" or other remote storage in communication with other computing systems. In embodiments, data (e.g., readings obtained by the sensor 128 and the dynamic responses of the computing system 130 thereto) may be stored in the remote storage 50 for analytics.

Figure 5:
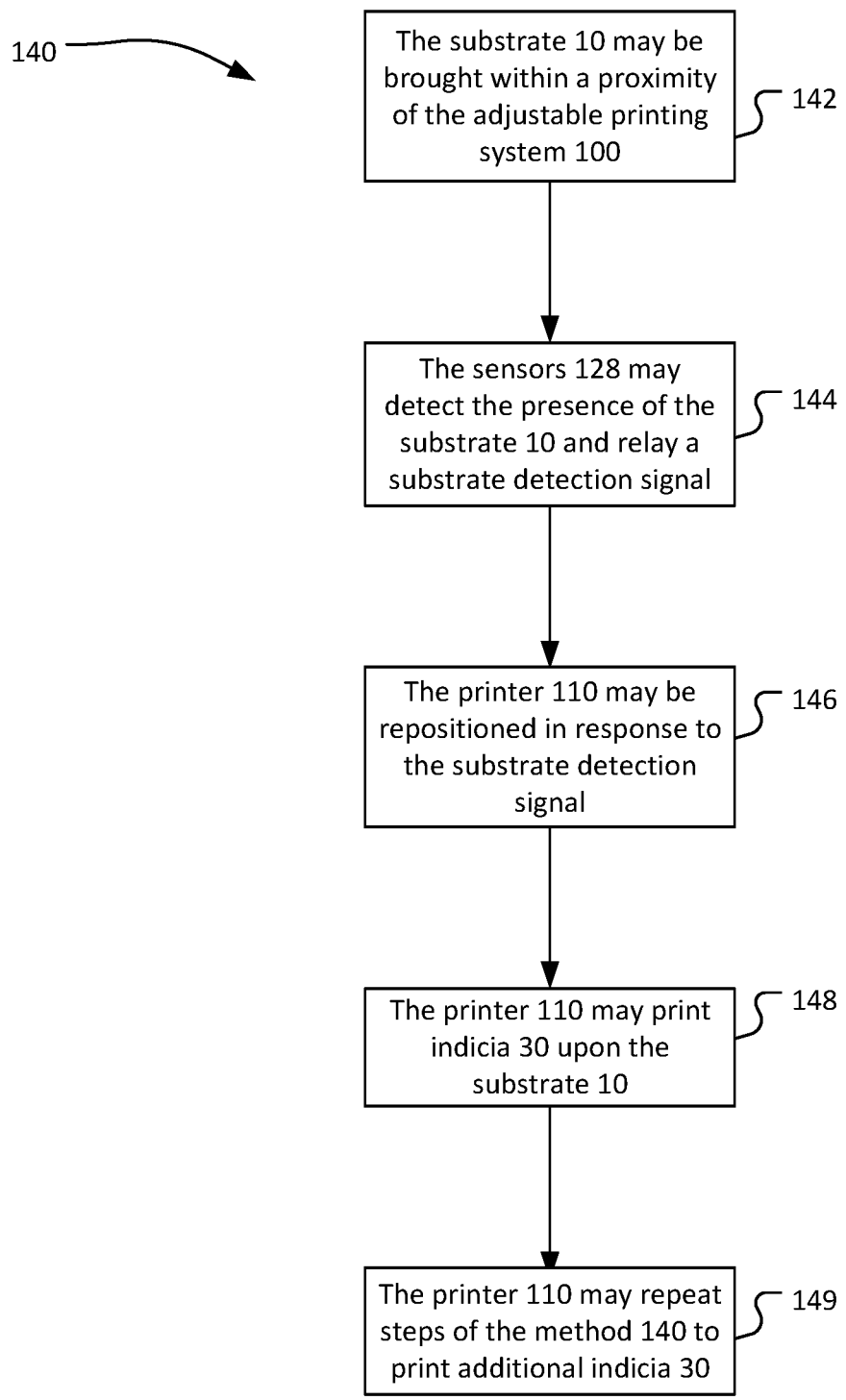
FIG. 5 is a flowchart illustrating a method for using the adjustable printing system of FIG. 1, in an embodiment.

FIG. 5 depicts a method 140 for operating the various embodiments of the adjustable printing system disclosed herein. First, at step 142, the substrate 10 (e.g., a surface thereof) may be brought within a proximity (e.g., a sensor 128 detecting range) of the adjustable printing system 100, such as by a conveyor belt or other suitable production line devices. Then, at step 144, the sensors 128 may detect the presence of the substrate 10 and relay a substrate detection signal to the printer 110 and/or the arm 120 (e.g., via the computing system 130). In response to the substrate detection signal, at step 146, the arm 120 may move to reposition the printer 110. For example, the software 131 may respond to the substrate detection by directing the arm 120 to move the printer 110 to a surface of the substrate 10 such that the printer 110 may begin printing indicia 30 thereupon.

At step 148, the printer 110 may begin printing indicia 30 on a surface of the substrate 10. For instance, the software 131 may direct the printer 110 to initiate printing the indicia 30 on the surface based upon the sensor 128 detection of the surface. In embodiments, the printer 110 may instead be directed to print upon a label 20 applied to the substrate 10 (i.e., upon a previously applied label 20). At step 149, several steps of the method 140 may be repeated. For example, the arm 120 may reposition the printer 110 to another surface (e.g., another face) of the substrate 10 and subsequently print additional indicia 30 thereon. As another example, the arm 120 may reposition the printer 110 to another area of the surface that has the previously printed indicia 30. The printer 110 may then print a second set of indicia 30 on that same surface. The second set of indicia 30 may be located, for example, adjacent, above, below, to the left and/or right, etc., of the first set of indicia 30.

The method 140 may be modified, added to, and/or omitted as desired, and such considerations are contemplated and are within the scope of the present disclosure. For example, the artisan will understand that the method 140 may be readily modified to initiate printing upon the substrate 10 via rollers 114 (as opposed to responding to a sensor 128 detection). As another example, the printer 110 may print indicia 30 on a label 20 alternately or in addition to the substrate 10. As yet another example, the method 140 may include the step of adjusting a printing path of the printer 110 (e.g., via the rollers 114).

As noted, the apparatus 100 may be used to print indicia directly onto a substrate 10, and/or may be used to print indicia on a label 20 disposed on the substrate 10. The apparatus 100 is usable with various types of labels 20.

One example of a type of label 20 that may be printed and/or applied using the apparatus 100 is a conventional liner label, which comprises a face ply, an adhesive layer, and a liner ply. The face ply may have a top side where indicia (e.g., information, icons, text, etc.) may be printed, and a bottom side where the adhesive layer (e.g., hot-melt, acrylic based, rubber based, pressure sensitive, drying, etc.) is applied. The adhesive used may include: permanent (i.e., adhesive that is relatively difficult to remove once applied), removable (i.e., adhesive that is relatively easy to peel off), remoistenable (i.e., adhesive that may be activated by moisture), repositionable (i.e., adhesive that is relatively easy to remove and reapply for a short period of time before becoming permanent), et cetera. The liner ply may contain a release agent (e.g., silicone) on one or both sides, for removably coupling the liner ply to the bottom side of the face ply. In operation, the liner ply may be used to prevent the adhesive along the conventional liner label from adhering to undesirable substrates. The liner ply may be removed to expose the adhesive prior to adhering the label to the substrate. In some embodiments, the label may forgo the use of a liner ply, and instead use specially crafted equipment that may reduce or eliminate occurrences of the exposed adhesive sticking to undesirable substrates (e.g., printer parts).

Another example of a type of label 20 that may be used with the adjustable printing system 100 is a label with a "dissolvable liner". The dissolvable liner of the label 20 may be unlike traditional paper liners that must be peeled away from the face ply of the label 20 to expose the adhesive on the underside of the face ply. The face ply of the dissolvable liner label may have a top face, where indicia may be printed (e.g., information, icons, text, etc.) and a bottom face where the adhesive layer may be located. The adhesive layer may be made up of adhesives (e.g., hot melt, acrylic based, rubber based, pressure sensitive, drying, etc.), which may cover some or all of the bottom face. In some embodiments, the adhesive layer may have a pattern of coverage (e.g., cross-hatch, spaced dots, stripes, etc.) on the bottom face, and an additional hydrophilic layer (e.g., an ink jet coating) may be added between the adhesive layer and the bottom face. In operation, and depending on the configuration of the substrate 10 and/or the face ply, the adhesive layer pattern of coverage may allow the label 20 to more desirably adhere to a substrate 10 and/or another label 20. The dissolvable liner of the label 20 is unlike traditional paper liners that have to be peeled away from the face stock of the label 20 to expose the adhesive on the underside of the face stock. While traditional labels having conventional adhesive (e.g., pressure sensitive adhesive) may undesirably adhere to surfaces they contact if the labels were without the traditional paper liner, the dissolvable liner may circumvent such issues. In other words, the dissolvable liner may render the adhesive on the face ply unusable to secure the label 20 to a substrate until certain steps are taken. In embodiments, the dissolvable liner may render the adhesive on the face ply unusable to secure the label 20 to a substrate until the dissolvable liner is moistened, at which point the adhesive on the face ply may be used to secure the label 20 to the substrate 10.

Broadly, the phrase "dissolvable liner", as used herein, refers to a cover or coating for covering a first composition, which cover is specifically adapted to begin to dissolve or otherwise dispel when the cover is brought into contact with a second composition. When the cover is brought into contact with a third composition (either after the cover is brought into contact with the second composition or generally simultaneously therewith), the cover is configured to be absorbed into both the first composition and the third composition. In embodiments, the first composition may be an adhesive arranged on the label 20, the second composition may be water (e.g., water vapor, liquid water, et cetera), and the third composition may be the substrate 10. That is, in embodiments, the dissolvable liner may be a composition that: (a) covers the adhesive layer of the label 20 so as to preclude the adhesive layer from undesirably sticking to another object or surface (the dissolvable liner inactive state); and (b) is configured to dissolve and/or dispel when the dissolvable liner is brought into contact with a fluid (the dissolvable liner active state). In the active state, the label 20 with the dissolvable liner may be readily adhered to the substrate 10 (i.e., the dissolvable liner may disintegrate and expose the label 20 adhesive layer). The term "dissolvable liner", as used herein, specifically excludes a traditional liner ply or plies, such as paper coated at least in part with silicone or other release material, a film, et cetera. The term "dissolve", as used herein, connotes that the dissolvable liner coating, once wetted, is dispelled or otherwise displaced. The dissolvable liner may be absorbed (e.g., partially, wholly) by the substrate 10. The dissolvable liner may thus perform the same function of a traditional liner (i.e., to cover the adhesive layer until the label is ready to be secured to a substrate) made of paper or polyester, but without employing a traditional liner ply. In embodiments, the dissolvable liner may comprise a remoistenable adhesive, ACC water, and gypsum.

Figure 6:
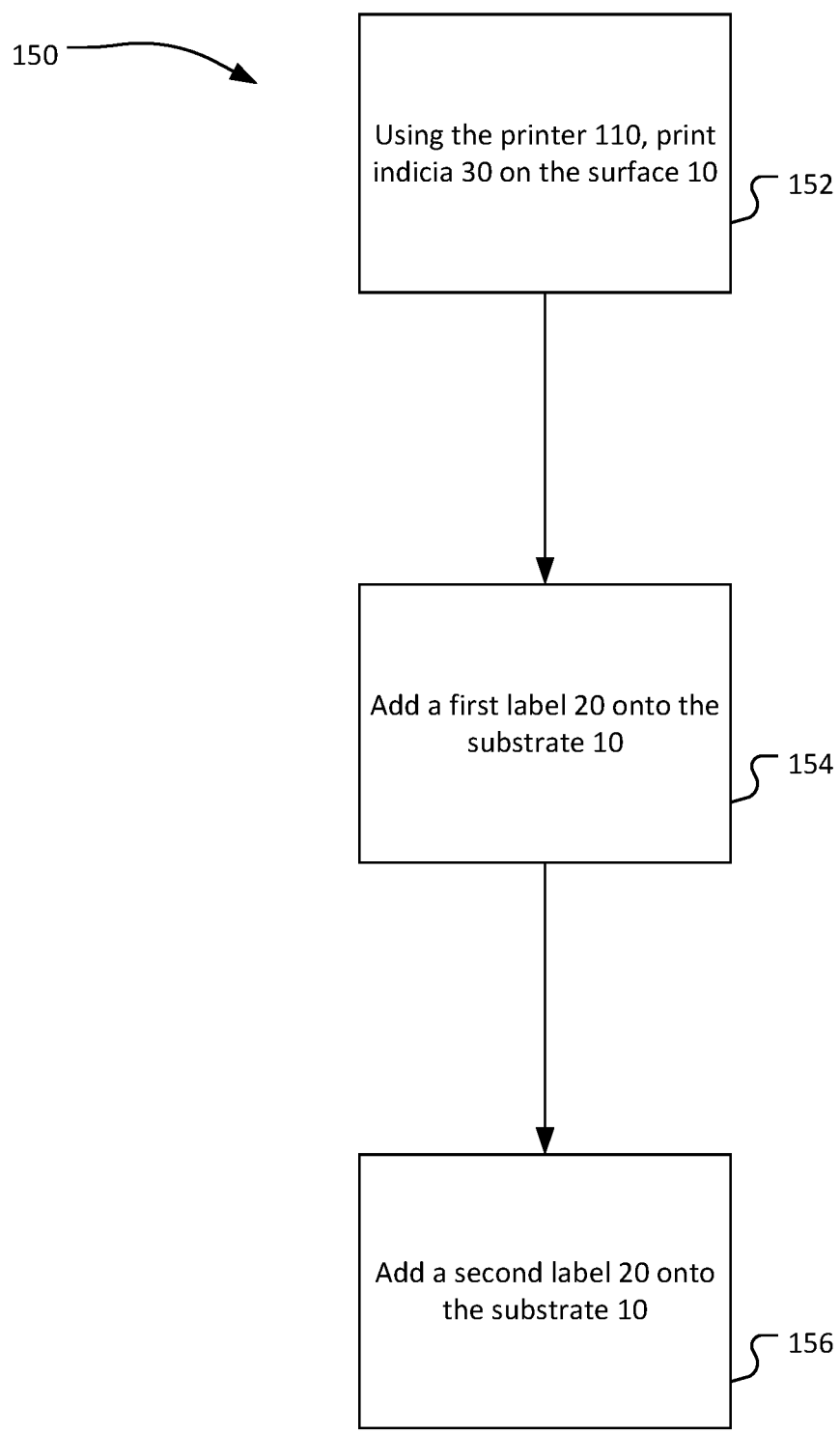
FIG. 6 is a flowchart illustrating a method for using the adjustable printing system of FIG. 1, in another embodiment.

In embodiments, printed labels 20 (e.g., conventional labels, labels with dissolvable liner, etc.) may be stacked onto the substrate 10 and/or each other. FIG. 6 is a flowchart illustrating a method 150 for stacking labels 20 on top of indicia 30 printed directly onto the substrate 10. First, at step 152, indicia 30 is printed directly on a substrate 10 with the printer 110 (e.g., by inkjet printing). Next, at step 154, a first label 20 (which may have indicia 30 printed upon it (e.g., by the handheld printer 110)) may be applied to the substrate 10. The first label 20 may be a dissolvable liner label or a conventional liner label. For example, the liner ply may be removed from the face ply of the conventional liner label to expose the adhesive along the bottom side for application to the substrate 10, or the substrate 10 and/or the label may be wetted and the dissolvable liner label may be placed in contact with the substrate 10 for adhesion therebetween. Marketing materials may be incorporated as described above. The first label 20 may be placed in such a way that it covers (i.e., obscures) some or all of the previously printed indicia 30. In embodiments, the first label 20 may be situated such that it only covers part of the printed indicia 30.

At step 156, a second label 20, either a dissolvable liner label or a conventional liner label, may be applied. The second label 20 may be applied over the substrate 10, the first label 20, the printed indicia 30, or some combination thereof. For example, the second label 20 may be placed in such a manner as to cover the entire first label 20, except for any tabs of marketing materials of the first label 20. In embodiments where the second label 20 is a dissolvable liner label, both the substrate 10 and the first label 20 may be wetted in preparation for application of the dissolvable liner label. In some embodiments, the dissolvable liner labels may be wetted instead of or in addition to the substrate 10.

The printed indicia 30 and number of labels 20 that can be stacked as described is not limited by the present disclosure. Further, the various steps may be implemented in a different order (e.g., a first label 20 may be placed upon a substrate 10, then indicia 30 may be printed upon the substrate 10, with a second label 20 then being placed over the first label 20, the indicia 30, and/or the substrate 10) or one or more of the steps may be omitted as desired (e.g., a second label 20 may be omitted), et cetera.

One advantage of the adjustable printing system 100 is that it may allow for the reduced usage of labels 20, by printing information such as indicia 30 directly upon a substrate 10. Since the labels 20 require materials to create (e.g., adhesives, liners, face stock, etc.), reducing (or in embodiments, eliminating) the number of labels used may reduce the overall cost and/or waste byproducts of a product or package being labelled. In some embodiments, the use of the adjustable printing system 100 may reduce the overall number of printing systems required for a printing application. For example, a conventional printing system may require several individual printers to print indicia upon different sides of a substrate 10 (e.g., two individual printers along a conveyor for printing indicia 30 upon two opposite sides of a box). The adjustable printing system 100 (e.g., a portion thereof) may instead be configured to move about the substrate 10 to print indicia 30 (e.g., the adjustable printing system 100 may first print upon one side of a substrate 10, then the adjustable printing system 100 may reposition to print upon an opposing side of the substrate 10).

While the disclosure focuses on the shipping industry applications, the artisan will understand from the disclosure herein that the adjustable printing system 100 may likewise be used in other industries (e.g., packaging industries such as pharmaceutical packaging and food and beverage packaging, for labeling parts, et cetera).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the present disclosure. Not all steps listed in the various figures need be carried out in the specific order described.

The disclosure claimed is:

1. A method to print indicia on a substrate, comprising:
    removably attaching a portable and handheld printer to an automated arm, said portable printer being capable of manual operation with a hand of a user, said portable printer having a handle configured to be held by said hand, said portable printer having a housing including a roller;
    detecting said substrate using a sensor;
    printing indicia on a first face of said substrate using said portable printer;
    using said roller to detect a print path of said portable printer;
    adjusting said print path of said portable printer based on said detection;

removing said portable printer from said automated arm; and printing indicia on a second face of said substrate using a hand of a user to actuate said portable printer after removing said portable printer from said automated arm.

2. The method of claim 1, wherein said substrate is a box.

3. The method of claim 1, further comprising situating a label having at least one ply on said first face atop said printed indicia to cause at least part of the printed indicia to be obscured.

4. The method of claim 3, further comprising printing on said label using said portable printer.

5. The method of claim 1, further comprising equipping said automated arm with a plurality of rotation devices.

6. The method of claim 5, wherein said portable printer is a handheld inkjet printer.

7. The method of claim 1, further comprising stacking a plurality of printed labels on said first face, each of the plurality of printed labels having at least one ply.

8. A method to print indicia on a substrate, comprising:
removably attaching a portable and handheld printer to an automated arm, said portable printer being capable of manual operation with a hand of a user, said portable printer having a roller, said automated arm having at least one rotation device configured to move said automated arm;
detecting said substrate on a conveyer belt using a sensor;
printing indicia on a first face of said substrate automatically using said portable printer;
using said roller to detect a print path of said portable printer;
adjusting said print path of said portable printer based on said detection;
repositioning said portable printer to a second face of said substrate automatically; and
printing indicia on said second face of said substrate automatically using said portable printer.

9. The method of claim 8, further comprising using said automated arm to move said portable printer such that it prints indicia on each of said first face and said second face of said substrate.

10. The method of claim 8, further comprising providing a roller in a housing of said portable printer.

11. The method of claim 8, further comprising adhering a label having at least one ply to said first face.

12. The method of claim 11, wherein said label obscures at least a part of said printed indicia on said first face.

13. The method of claim 11, wherein said label obscures only a part of said printed indicia on said first face.

14. The method of claim 11, further comprising securing a second label having at least one ply atop said label such that at least a portion of said label is obscured.

15. The method of claim 8, wherein said at least one rotation device is a motorized device.

16. A method to print indicia on a substrate, comprising:
removably attaching a portable and handheld inkjet printer to a movable arm, said portable printer being capable of manual operation with a hand of a user, said portable printer having a roller;
printing indicia on a first face of said substrate automatically using said portable printer;
moving said movable arm automatically to move said portable printer;
detecting a print path of said portable printer with said roller;
adjusting said print path of said portable printer based on said detection;
printing indicia on a second face of said substrate using said portable printer; and
detaching said portable printer from said movable arm for manual operation via said hand of said user;
wherein, said movable arm is configured to be telescoping to move the portable inkjet printer from a first printing location to a second printing location.

* * * * *